United States Patent
Studer

[15] 3,694,041
[45] Sept. 26, 1972

[54] ELECTRIC MOTIVE MACHINE INCLUDING MAGNETIC BEARING

[72] Inventor: Philip A. Studer, Silver Spring, Md.
[73] Assignee: The United States of America as represented by the Administrator of the National Aeronautics and Space Administration
[22] Filed: Jan. 8, 1971
[21] Appl. No.: 104,884

[52] U.S. Cl. .................................................308/10
[51] Int. Cl. ..............................................F16c 39/06
[58] Field of Search......308/10; 73/517 B, 490; 74/5; 310/263; 318/259, 73

[56] References Cited
UNITED STATES PATENTS

| | | | |
|---|---|---|---|
| 2,822,694 | 2/1958 | McKenney | 74/5 |
| 3,305,740 | 2/1967 | Shano | 310/263 |
| 3,243,238 | 3/1966 | Lyman | 308/10 |
| 3,107,310 | 10/1963 | Carriere | 308/10 |
| 3,035,449 | 5/1962 | Hollman | 73/490 |

Primary Examiner—J. D. Miller
Assistant Examiner—R. Skudy
Attorney—R. F. Kempf, Neil Siegel and John R. Manning

[57] ABSTRACT

A d.c. motor includes a plurality of stationary field windings and a stationary armature winding. Magnetic fluxes derived from the field windings interact with currents in the armature winding to produce a torque that rotatably drives a rotor about an axis that has a tendency to coincide with a common longitudinal axis for the armature and field windings. The displacement of the rotor axis relative to the common axis is sensed to provide a signal for controlling the currents in the field windings. The currents in the field windings displace the rotor so that the rotor axis has a tendency to coincide with the common axis. The rotor is thereby magnetically suspended, without mechanical or air bearings, by the same forces that rotate it. To maintain the rotor speed constant, the total current in the field windings is maintained constant.

17 Claims, 5 Drawing Figures

INVENTOR,
PHILIP A. STUDER
BY NEIL B. SIEGEL
ATTORNEYS

INVENTOR,
PHILIP A. STUDER
BY
NEIL B. SIEGEL

ATTORNEYS

ELECTRIC MOTIVE MACHINE INCLUDING MAGNETIC BEARING

ORIGIN OF THE INVENTION

The invention described herein was made by an employee of the United States Government and may be manufactured and used by or for the Government for governmental purposes without the payment of any royalties thereon or therefor.

FIELD OF INVENTION

The present invention relates generally to electric motive machines and more particularly to such a machine wherein a magnetic bearing for a rotor is provided by the same magnetic fluxes that cause rotation of the rotor.

BACKGROUND OF THE INVENTION

Presently, mechanical bushings and/or bearings are generally used for supporting the rotor of electric motive machines, i.e., motors and generators. Mechanical bushings or bearings have well known limitations regarding length of service, reliability and power dissipation. Gas bearings have been employed to overcome the problems of mechanical bushings or bearings. Gas bearings, however, are not compatible with a vacuum outer space environment because of the necessity to maintain a voluminous gas supply on a spacecraft.

To overcome the problems of mechanical bearings and bushings and gas bearings in outer space, magnetic bearings have been employed. Some of these bearings have been successfully employed, but they have generally required substantial amounts of power and have been relatively heavy. In consequence, there has not been wide acceptance of magnetic bearings for supporting motor and generator rotors in outer space applications.

BRIEF DESCRIPTION OF THE INVENTION

In accordance with the present invention, the rotor of an electric motive machine is provided with magnetic bearings that, in essence, result from the interaction between the magnetic fluxes derived from a plurality of d.c. field windings and the current flowing in an armature. The field winding fluxes interact with the armature current to rotate the rotor in a known manner. In addition, the relative amplitudes of the field winding fluxes are varied in response to output signals of rotor position sensors so that the rotor has a tendency to be located in a predetermined spacial position relative to the field windings. Thereby, the same power that is employed to drive the rotor is utilized for magnetically suspending it and providing a magnetic bearing. Since the same forces that drive the rotor are utilized to suspend it to form a magnetic bearing, there is no substantial additional power required for the magnetic bearing assembly. In addition to the advantage of reduced power requirements, a machine in accordance with the present invention has lower weight than prior art magnetic bearing supported rotors because there is no auxillary magnetic bearing structure.

To enable the rotor to be driven at substantially constant speed regardless of the restoring force applied thereto as a result of the magnetic bearing action, the sum of the currents in the separate field windings is maintained constant. Thereby, the total field winding magnetic flux interacting with the armature current remains substantially fixed so that the torque applied to the rotor is constant.

According to one particular embodiment to be described in detail the principles of the present invention are employed in a d.c. motor having a plurality of stationary field windings, a stationary armature and a rotatable rotor that is magnetically coupled to the stationary windings and the armature. Four field windings are arranged at mutually right angles to each other about a common axis and supply magnetic fluxes to one segment of a two-part rotor. The magnetic fluxes are coupled by the first named segment of the rotor to a magnetic core of the armature. The flux flows circumferentially in the armature core to the second segment of the rotor, from which it flows back to the field winding to complete the magnetic circuit. The magnetic fluxes flowing out of the first rotor segment and into the second rotor segment interact with the current in the armature to produce a torque that drives the rotor.

The axial position of the rotor is detected with four mutually orthogonal sensors. Opposed pairs of the sensors derive signals indicative of the displacement of the rotor relative to a common axis of the four field windings and the armature in two mutually orthogonal directions. The signals derived from opposed pairs of the position sensors control the relative currents in field windings aligned with the detectors. Thereby, the radial position of the rotor is controlled in mutually orthogonal directions so that the rotor has a tendency to be stabilized in radial position along the common axis of the field windings and armature by the same means that rotatably drives the rotor.

To enable the rotor to be rotated at a predetermined angular velocity about the axis thereof substantially independently of its radial position, the total current fed to the field windings is maintained constant. Thereby, the total flux interacting with the armature windings is maintained constant, so that a total constant torque is applied at any time to the rotor. For the d.c. motor application, a commutating means, preferably of the brushless type, is provided to establish the proper instantaneous current flow in the armature winding.

While the embodiment of the invention to be described specifically is a d.c. motor of the torquer type, it is to be understood that the principles of the invention are applicable to other electric motive machines, such as other types of motors or generators. In addition, the principles of the invention can be applicable to an axial magnetic bearing equally as well as to a radial magnetic bearing.

It is, accordingly, an object of the present invention to provide a new and improved magnetic bearing for an electric motive device.

Another object of the invention is to provide an electric motive device including a magnetic bearing that requires a minimum amount of additional power and weight.

A further object of the invention is to provide a new and improved electric motive device wherein reaction forces between field winding fluxes and armature current are employed to drive a rotor, as well as to form a magnetic bearing.

An additional object of the invention is to provide a new and improved d.c. motor including stationary field and armature windings wherein interaction forces between the windings drive a rotor and function as a magnetic bearing for the rotor.

The above and still further objects, features and advantages of the present invention will become apparent upon consideration of the following detailed description of one specific embodiment thereof, especially when taken in conjunction with the accompanying drawings.

DETAILED DESCRIPTION OF THE DRAWING

Figure 1:
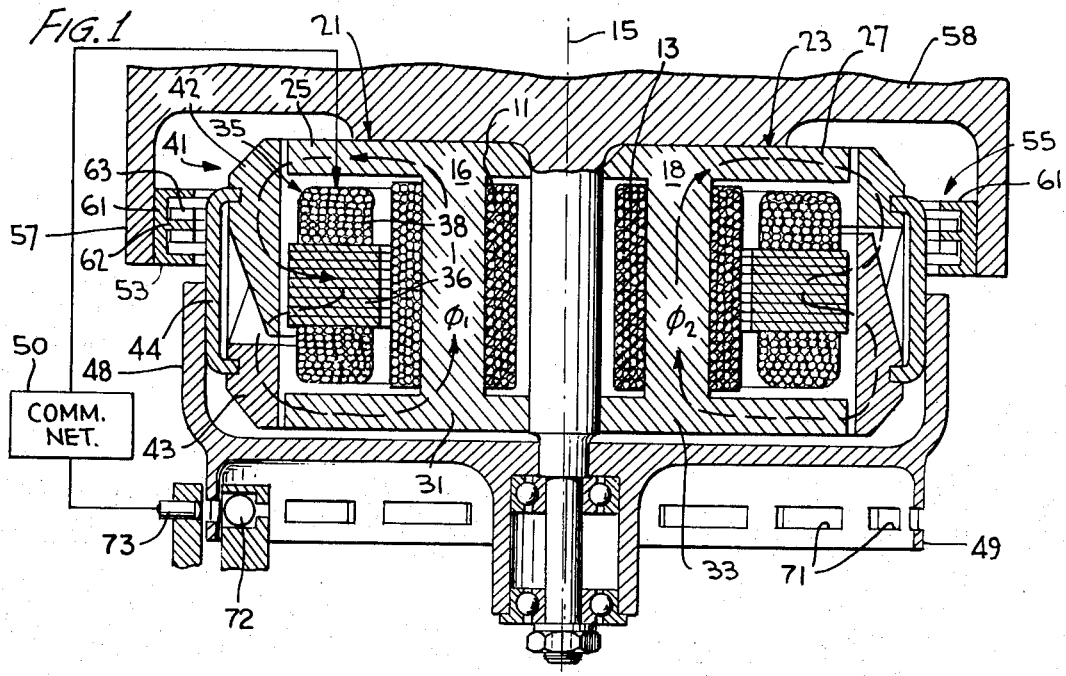
FIG. 1 is a side-sectional view of one embodiment of the present invention.
Figure 2:
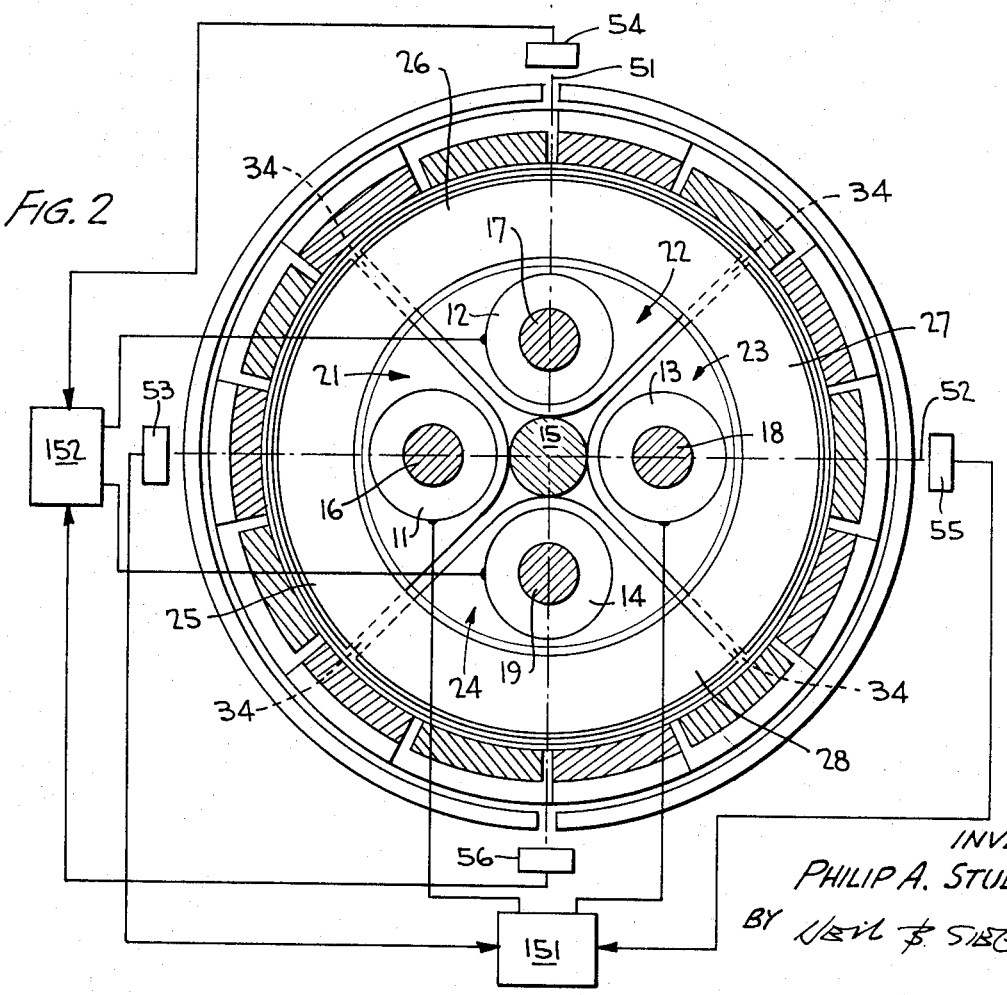
FIG. 2 is a top sectional view of the motor of FIG. 1, taken through the lines 2—2.
Figure 3:
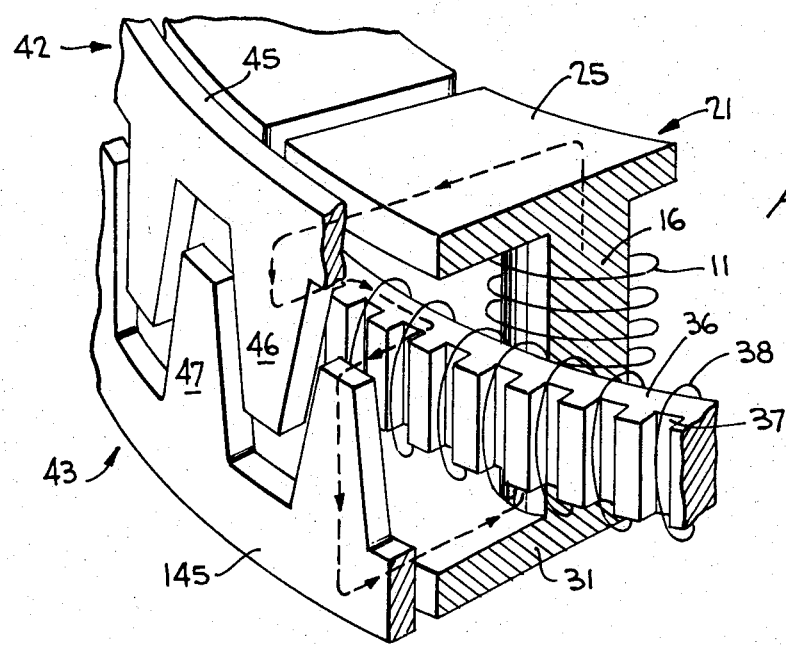
FIG. 3 is a perspective view of a segment of the motor illustrated in FIGS. 1 and 2.

Reference is now made to FIGS. 1-3 of the drawing wherein there is illustrated a d.c. motor incorporating the principles of the present invention. The d.c. motor includes four field winding coils 11-14 symmetrically disposed about a longitudinal axis 15 at mutually right angles in spaced quadrature relationship to each other. Each of field coils 11-14 is respectively wound about separate legs 16-19 of four separate low magnetic reluctance, iron pole pieces 21-24. Pole pieces 21-24 are fixedly mounted relative to axis 15 and field windings 11-14 are wound thereon so that their longitudinally axis are fixedly positioned along lines running parallel to and equidistant from axis 15.

Field windings 11-14 are wound on legs 16-19 and excited with d.c. current in such a manner that they, in effect, form electromagnets having similarly directed poles. Thus, in FIG. 1, electromagnets formed by field windings 11 and 13 both have north poles at the top of legs 16 and 18 so that d.c. magnetic flux flows out of the tops of the legs. The magnetic flux flows similarly from the top of each of legs 16-19 into the upper, radially extending arcuate arms 25-28 of pole pieces 21-24, respectively. Pole pieces 21-24 are symmetrical about a center line perpendicular to axis 15, whereby each includes top and bottom radially extending, arcuate arms; the bottom arms for pole pieces 21 and 23 are illustrated in FIG. 1 and designated by reference numerals 31 and 33. The arcuate, radially extending arms of pole pieces 21-24 are spaced from each other by radially extending air gaps 34, whereby a separate magnetic circuit is provided for each of field windings 11-14.

Fixedly mounted on pole pieces 21-24 in gaps outside of field windings 11-14 that extend between the top and bottom of radially extending arms of the different pole pieces is an annular armature 35. Armature 35 is secured in situ by any suitable, nonmagnetic means, such as a potting substance. The armature includes a laminated, annular, low magnetic reluctance iron core 36 having teeth 37 through which armature winding 38 is wound. Teeth 37 extend in a direction parallel to axis 15, whereby a radially directed flux derived from field windings 11-14 flowing through core 36 can interact with current flowing in windings 38 to produce motor action. Armature winding 38, in one preferred embodiment, includes three separate coils connected to a d.c. source via a commutator, preferably of the solid state or photoelectric type, as disclosed in the copending application of Philip A. Studer, NASA Case No. 5290, Ser. No. 754,019, filed Aug. 20, 1968, now U.S. Pat. No. 3,569,814 entitled "Direct Current Motor With Stationary Armature and Field." The coils are wound in teeth 37 so that the same coil extends through every third tooth and the two intermediate teeth are occupied by the other two coils, i.e., on coil extends through teeth numbered one, four, seven, etc., a second coil extends through teeth two, five, eight, etc., and the third coil extends through teeth three, six, nine, etc. For convenience in FIG. 3 the coils of winding 38 are shown as extending behind core 36, but in actuality the coils preferably extend circumferentially along the core top and bottom faces to conserve copper.

Figure 4:
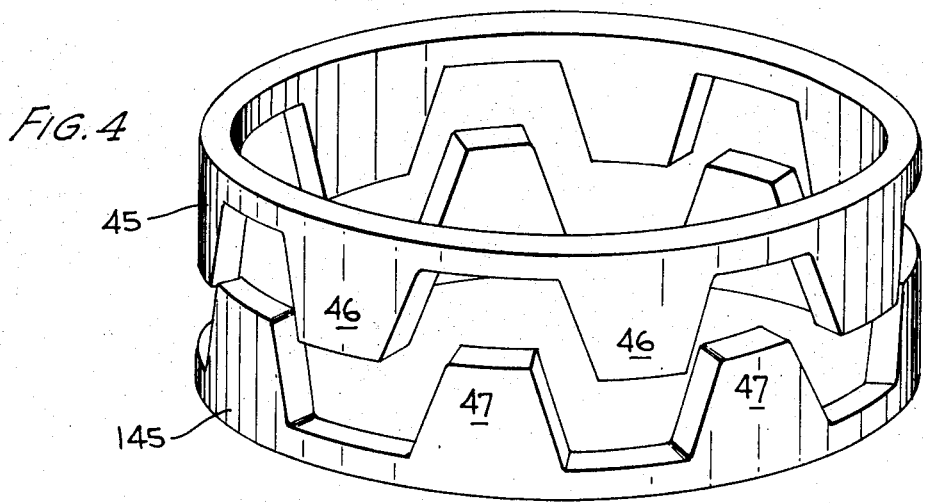
FIG. 4 is a perspective view of the salient poles included in the rotor of the motor of FIGS. 1—3.

To couple the magnetic fluxes derived from field windings 11-14 in a radial direction through armature core 36 and enable useful work to be derived from the machine, rotor 41 is provided. Rotor 41 includes a pair of low magnetic reluctance, iron, salient pole pieces 42 and 43 mechanically connected to each other by a nonmagnetic binder 44. As illustrated in the perspective views of FIGS. 3 and 4, as well as the cross-sectional and top views of FIGS. 1 and 2, each of salient pole pieces 42 and 43 is shaped somewhat like a crown. Pole pieces 42 and 43 respectively include annular segments 45 and 145 from which protrude teeth or salient poles 46 and 47. Between adjacent salient poles of each of pole pieces 42 and 43 gaps are provided into which the salient poles of the other pole piece fit. The circumferential spacing of salient poles 46 and 47 is such that nine teeth of armature 36 are between corresponding segments of adjacent ones of poles 46 or adjacent ones of poles 47 whereby, e.g., the first coil is aligned with the center of adjacent ones of poles 46. Nonmagnetic binder 44 spaces salient poles 46 and 47 so that no parts of pole pieces 42 and 43 are in contact with each other to provide an air gap between the pole pieces. The length of pole pieces 46 and 47 from ring segments 45 and 145 is sufficiently great to extend axially past laminated core 36 and the radial spacing between the core and pole pieces is close enough that the magnetic reluctance between the pole pieces and the core is considerably less than between any adjacent segments of the two pole pieces.

To enable useful energy to be derived from rotor 41, end ring 48 is fixedly secured to the outer face of binder 44 so that the ring rotates with the binder and pole pieces 42 and 43. The radial and axial positions of rotor 41 are stabilized, without bearings, exclusively by the magnetic forces between field windings 11-14 and armature windings 38, as described infra.

To provide brushless, photoelectric commutation of armature windings 38, end ring 48 is provided with annular flange 49 having arcuate, circumferentially extending slots 71 therein. In axial alignment with slots 71 is a fixedly mounted photo detecting assembly comprising light source 72 and photo detector 73. As slots 71 rotated past fixed light source 72 and fixed photo detector 73, switching voltages are derived from the photo detector and feed to electronic network 50 to control the direction of current flow in the three coils of armature winding 38 to produce d.c. motor action in a well known manner; one configuration of network 50 is specifically described in the aforementioned Studer application.

The motor action resulting from the interaction of magnetic flux derived from field winding 11 causes rotation of rotor 41 about a longitudinal axis, generally coincident with axis 15, as best described by reference to the perspective view illustrated in FIG. 3, wherein it is assumed that winding 11 is energized by a d.c. source so that magnetic flux flows from the top of leg 16. The magnetic, d.c. flux flowing from the top of leg 16 enters radially extending arm 25, in which it flows outwardly in a radial direction. At the outer edge of arm 25, the magnetic flux jumps an air gap between the outer periphery of arm 25 and ring segment 45 of pole piece 42. The flux entering ring segment 45 from arm 25 has a tendency to be distributed equally along the entire circumference of the ring and thereby has a tendency to flow into each of the salient poles 46 of pole piece 42. Magnetic flux in pole piece 42, in fact, only enters the salient poles 46 which are in an arc subtended by the outer periphery of arm 25; any flux having a tendency to enter other salient poles on pole piece 42 does not do so because there is no low magnetic reluctance path provided therefor back to the lower end of leg 16. After the flux flows downwardly in salient poles 46 it turns 90° and is directed inwardly toward axis 15 to jump a relatively narrow air gap into laminated core 36 of armature 35. The flux flows into armature core 35, rather than into salient pole piece 43 because salient pole 46 is closer to armature core 36 than to any segment of salient pole 47. The flux flowing radially between salient poles 46 and core 36 interacts with the current in armature winding 38 to produce a torque that has a tendency to drive rotor 41 about its longitudinal axis. The magnetic flux coupled to core 36 flows circumferentially in both directions about the core until it reaches the salient poles 47 adjacent the pole 46 from which it entered core 36. The flux then turns 90° to flow in a radial outward direction across a relatively small air gap into salient poles 47. The magnetic flux flowing into salient poles 47 turns downwardly therein to ring segment 145 of pole piece 43. The flux in ring segment 145 jumps an air gap and flows radially inward to arm 31, at the bottom face of pole piece 21. The flux flows radially inwardly in arm 31 to the bottom of leg 16 to complete the magnetic circuit.

The same action occurs between the magnetic fluxes derived from field windings 12–14 as described with regard to field winding 11. Thereby, each of the field windings 11–14 produces a magnetic flux that interacts with the current in armature windings 38 over a different quadrant of the armature to cause rotation of rotor 41 about its longitudinal axis and to control rotor radial position as described supra.

To detect the radial position of rotor 41 relative to longitudinal axis 15 along two mutually orthogonal axes 51 and 52, position detectors 53–56 are provided. Position detectors 53–56 are positioned along axes 51 and 52 so that they are equidistant from axis 15 and radially aligned with the centers of legs 16–19, respectively. Detectors 53–56 are in proximity with the outer surface of rotor 41 to enable the position of the rotor to be determined relative to axis 15. Detectors 53 and 55 together can provide an indication of the rotor position relative to axis 51, while detectors 54 and 56 together enable an indication of the rotor position to be derived relative to axis 52. By positioning detectors 53–56 in radial alignment a pair of relatively simple control networks 151 and 152 can be employed to control the currents in windings 11–14. Network 151 controls the currents of windings 11 and 13 in response to the outputs of detectors 53 and 55, while the currents in windings 54 and 56 are controlled by network 152 in response to detectors 54 and 56.

Detectors 53–56 are fixedly mounted relative to axis 15 on arcuate flange 57 of assembly 58 to which pole pieces 21–24 are fixedly connected. Thereby, the relative position of the detectors is stabilized relative to axis 15, the stationary field windings 11–14 and the stationary armature 35. In the illustrated embodiment, each of detectors 53–56 is of the magnetic type and includes E cores 61 fixedly mounted on the interior surface of annular flange 57. On the center leg 62 of each of cores 61 is mounted a coil 63 which derives an output voltage indicative of the proximity of rotor 41 to the detector carrying the coil. It is to be understood that other position sensors, such as those of the capacitive or photoelectric type, can be employed in lieu of magnetic sensors.

To control the radial position of rotor 41 so that the longitudinal axis thereof has a tendency to be stabilized in coincidence with axis 15, the outputs of detectors 53–56 are combined in pairs in networks 151 and 152 to control the relative amplitudes of currents in field windings 11–14. The sum of the currents in field windings 11–14 is maintained substantially constant by networks 151 and 152 regardless of the outputs of detectors 53–56 so that the total torque applied to rotor 41 remains substantially constant and the rotor rotates at uniform angular velocity.

Figure 5:
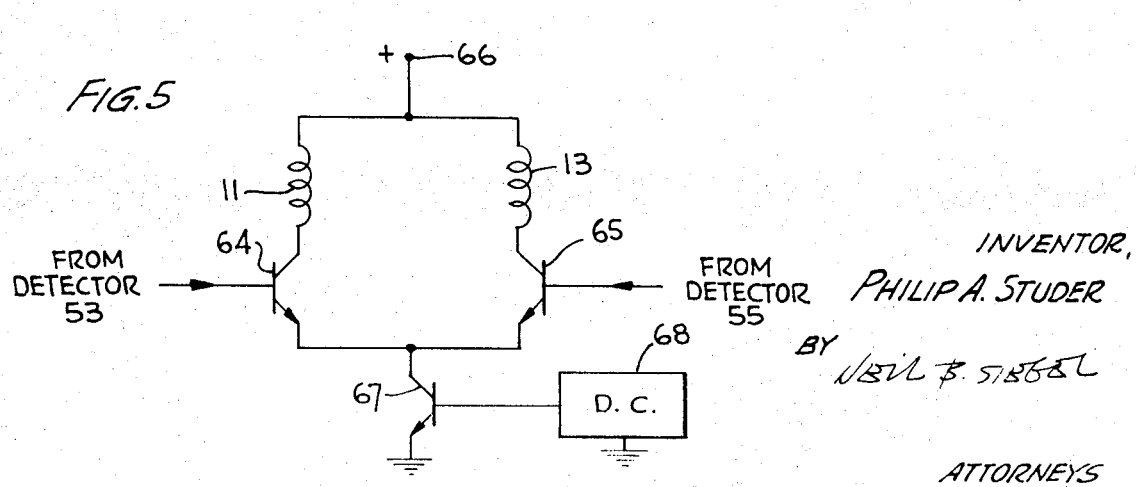
FIG. 5 is a circuit diagram of the device for controlling the current applied to a pair of the field windings of the d.c. motor illustrated by FIGS. 1—3.

To these ends, the outputs of detectors 53 and 55 are combined in network 151, FIG. 5, including NPN transistors 64 and 65. The bases of transistors 64 and 65 are responsive to output voltages derived from detectors 53 and 55, respectively. The collectors of transistors 64 and 65 are connected between a positive d.c. voltage source at terminal 66 and field windings 11 and 13, respectively. The emitters of transistors 64 and 65 have a common connection through the emitter collector path of transistor 67 to ground to form a differential amplifier. The emitter collector current of transistor 67 is controlled by d.c. source 68 connected to the base thereof.

The signals applied to the bases of transistors 64 and 65 from detectors 53 and 55 control the current in field windings 11 and 13, whereby the currents in the two field windings are substantially constant in response to equal output signals being derived from detectors 53 and 55. In response to the signal derived from detector 55 indicating that rotor 41 has translated from axis 15 so that it is in greater proximity to detector 53 than detector 55, the signals applied to the bases of transistors 64 and 65 control the current in windings 11 and 13 so that a greater current flows in winding 13 than in winding 11. In an opposite manner, the current in winding 11 exceeds that of winding 13 in response to the output of detector 55 being greater than the output of detector 53.

The circuit of FIG. 5 automatically provides that the sum of the currents in windings 11 and 13 is a constant, dependent upon the base voltage of transistor 67, regardless of the relative amplitudes of the voltages derived from detectors 53 and 55. This is because, for a particular voltage of source 68, a substantially constant voltage is always maintained across transistor 67 due to the negative feedback, emitter follower action between the emitter of transistor 64 and 65 and the bases thereof. Because a substantially constant voltage is maintained across transistor 67, the current flow therein is also substantially constant. Since the current in transistor 67 equals the sum of the current in windings 11 and 13 and a constant current flows through transistor 67, the sum of the currents flowing windings 11 and 13 is constant.

The circuit illustrated in FIG. 5 thereby reacts to the difference between the outputs of detectors 53 and 55 to supply differential currents to windings 11 and 13 to tend to stabilize the radial position of rotor 41 relative to axis 51. Stabilization of rotor 41 about axis 52 is attained with network 152 that is identical to the network illustrated in FIG. 5, whereby signals derived from detectors 54 and 56 are applied to bases of a second pair of transistors having a common emitter transistor load and separate collector loads comprising field windings 12 and 14. the transistors in the emitter circuits of networks 151 and 152 are responsive to the same d.c. voltage magnitude. Thereby, the sum of the magnetic forces applied to rotor 41 along axes 51 and 52 is equal. To vary the angular velocity of the rotor it is merely necessary to change the voltage applied to the bases of transistors 67 of networks 151 and 152.

While active, feedback means are employed for controlling the radial position of rotor 41, the axial position of the rotor is obtained passively because of the well known law that a magnetic flux always seeks the path of minimum magnetic reluctance. Because of this law the flux flowing from pole piece 42 into fixed core 36 and from core 36 into pole piece 43 stabilizes axial position of the pole pieces and thereby the entire rotor 41.

While there has been described and illustrated one specific embodiment of the invention, it will be clear that variations in the details of the embodiment specifically illustrated and described may be made without departing from the true spirit and scope of the invention as defined in the appended claims. For example, to reduce the power requirement of the field windings, a portion of the magnetic flux required for the field can be derived with four permanent magnets.

I claim:

1. an electric motive machine comprising a plurality of separate field windings, an armature winding, means for providing current flow in said field windings, means for providing current flow in said armature winding, a rotor for coupling flux derived from the field windings in an interacting relationship with current flowing in the armature winding whereby the rotor is driven relative to the field windings in response to the interaction, means for sensing the position of the rotor relative to the field windings, and means responsive to the sensing means for controlling the relative amplitudes of current flowing in said field windings to maintain said rotor in a predetermined position relative to the field windings.

2. The machine of claim 1 wherein the armature includes a winding fixedly mounted relative to the field windings.

3. The machine of claim 1 wherein the means for controlling maintains the total current in said field windings substantially constant.

4. The machine of claim 1 including means for supplying d.c. currents to said field windings and further including commutator means responsive to the motion of the rotor resulting from the interaction, said commutator means controlling the flow of d.c. current in the armature.

5. The machine of claim 4 wherein the commutator means senses the position of the rotor without contacting the rotor.

6. An electric motive machine comprising four field windings fixedly mounted along radii angularly displaced 90° from each other relative to a longitudinal axis, an armature including a winding, a rotor having an axis, a magnetic circuit including the field windings, rotor, and armature, said magnetic circuit producing a torque in the rotor in response to an interaction between current flowing in the armature winding and magnetic flux derived from the field windings, said torque rotating said rotor about the rotor axis, means tending to align said rotor axis with the longitudinal axis, said last named means including: position sensors for the radial position of the rotor along radii from the longitudinal axis, said radii being angularly displaced 90° from each other, and means responsive to the sensors for controlling the relative amplitudes of currents in the field windings.

7. The machine of claim 6 wherein the means for controlling includes means for maintaining the total field winding current constant.

8. The machine of claim 6 wherein the position sensors are radially aligned with the field windings.

9. The machine of claim 6 wherein the armature is fixed relative to the field windings and has an axis coincident with the longitudinal axis.

10. The machine of claim 9 wherein the rotor includes a pair of low magnetic reluctance pole pieces, said pole pieces being included in said magnetic circuit so that magnetic flux flows from one of said pole pieces into the armature and from the armature into the other pole piece.

11. The machine of claim 6 wherein two pairs of said position sensors are provided, the sensors of one of said pairs being equidistant from and on opposite sides of the longitudinal axis and on radii coincident with a first pair of said field windings, the sensors of the second of said pairs being equidistant from and on opposite sides of the longitudinal axis and on radii coincident with a second pair of said field windings.

12. The machine of claim 11 further including means for controlling the relative currents in the first pair of field windings in response to the difference in position detected by the sensors of the first pair of sensors, and means for controlling the relative currents in the second pair of field windings in response to the difference in position detected by the sensors of the second pair of sensors.

13. The machine of claim 12 further including means for maintaining the sum of the currents in the first pair of field windings at a fixed level, and means for maintaining the sum of the currents in the second pair of field windings at a second fixed level equal to the first fixed level.

14. The machine of claim 6 further including commutator means responsive to rotation of the rotor for controlling the direction current flows through the armature winding.

15. An electric motive device comprising electromagnet means for deriving a magnetic flux, an armature winding fixedly positioned with respect to said electromagnet means, a magnetic rotor mechanically free of said electromagnet means and said winding, means establishing for the derived magnetic flux a moving magnetic flux path through the rotor and the winding in such a manner as to drive the rotor in a first sense in response to interacting forces between magnetic flux in the armature resulting from current flowing in the armature and the magnetic flux in the rotor and armature, means sensing the position of the rotor relative to the armature for deriving a signal indicative of the relative position of the armature and rotor in a second sense, and means responsive to the signal for controlling the current applied to the electromagnet means to control the position of the rotor in the second sense.

16. An electric motive device comprising a plurality of field windings forming electromagnets, an armature including a winding, a rotor, said armature and field windings being fixedly mounted relative to each other, said rotor being mechanically free of the armature and field windings, a magnetic circuit including the field windings, rotor, and armature, said magnetic circuit including means for establishing a moving magnetic field to drive the rotor in a first sense in response to an interaction between current flowing in the armature winding and magnetic flux derived from the field windings, means sensing the position of the rotor relative to the armature for deriving a signal indicative of the relative position of the armature and rotor in a second sense, and means responsive to the signal for controlling the relative amplitudes of currents applied to the field windings to control the position of the rotor in the second sense.

17. An electric motive machine comprising a plurality of field windings fixedly mounted along radii angularly displaced from each other relative to a longitudinal axis, an armature including a winding, a rotor having an axis, a magnetic circuit including the field windings, rotor, and armature, said magnetic circuit producing a torque in the rotor in response to an interaction between current flowing in the armature winding and magnetic flux derived from the field windings, said torque rotating said rotor about the rotor axis, means tending to align said rotor axis with the longitudinal axis, said last named means including: position sensors for the radial position of the rotor along radii from the longitudinal axis, said radii being angularly displaced from each other, and means responsive to the sensors for controlling the relative amplitudes of currents in the field windings.

* * * * *